US010027732B2

(12) United States Patent
Hutton (10) Patent No.: US 10,027,732 B2
(45) Date of Patent: Jul. 17, 2018

(54) METHOD AND SYSTEM FOR NEGOTIATION OF MEDIA BETWEEN COMMUNICATION DEVICES FOR MULTIPLEXING MULTIPLE MEDIA TYPES

(71) Applicant: Unify GmbH & Co. KG, Munich (DE)

(72) Inventor: Andrew Mark Hutton, Chilwell (GB)

(73) Assignee: Unify GmbH & Co. KG, Munich (DE)

( * ) Notice: Subject to any disclaimer, the term of this patent is extended or adjusted under 35 U.S.C. 154(b) by 1 day.

(21) Appl. No.: 15/210,943

(22) Filed: Jul. 15, 2016

(65) Prior Publication Data
US 2016/0330262 A1 Nov. 10, 2016

Related U.S. Application Data

(63) Continuation of application No. 14/226,119, filed on Mar. 26, 2014, now abandoned.

(30) Foreign Application Priority Data

Mar. 27, 2013 (EP) .................................... 13001599

(51) Int. Cl.
*H04L 29/06* (2006.01)
*H04L 12/741* (2013.01)
*H04L 29/12* (2006.01)

(52) U.S. Cl.
CPC ............ *H04L 65/602* (2013.01); *H04L 45/74* (2013.01); *H04L 61/2007* (2013.01);
(Continued)

(58) Field of Classification Search
CPC ..... H04L 29/12; H04L 29/06; H04L 61/2007; H04L 61/2564; H04L 61/2514;
(Continued)

(56) References Cited

U.S. PATENT DOCUMENTS 7,953,867 B1 * 5/2011 Andreasen .......... H04L 65/1006
709/203
8,059,656 B1 * 11/2011 Telikepalli .......... H04L 65/1069
370/395.2
(Continued)

FOREIGN PATENT DOCUMENTS

| CN | 101132366 A | 2/2008 |
| WO | 2012175227 A1 | 12/2012 |
| WO | 2012175228 A1 | 12/2012 |

OTHER PUBLICATIONS

Handley, "SDP: Session Description Protocol", https://tools.ietf.org/html/rfc4566#section-4.1, (Jul. 2006).*
(Continued)

*Primary Examiner* — Andrew Chriss
*Assistant Examiner* — Rasha Fayed
(74) *Attorney, Agent, or Firm* — Buchanan Ingersoll & Rooney PC (57) ABSTRACT

A method of negotiation of media between a source communication device and a destination communication device for multiplexing multiple media types on an IP transport address comprises the source communication device generating an offer message comprising an extension to the ICE protocol according to RFC 5245 to specify the IP transport address whereon the multiple media types can be multiplexed, wherein the offer message comprising the extension indicates support for both the multiplexing and a non-multiplexing of the multiple media types, and sending the offer message from the source communication device to the destination communication device.

20 Claims, 3 Drawing Sheets

(52) U.S. Cl.
CPC ........ *H04L 65/1069* (2013.01); *H04L 65/607* (2013.01); *H04L 65/608* (2013.01); *H04L 65/80* (2013.01)

(58) Field of Classification Search
CPC . H04L 61/2585; H04L 61/2575; H04L 45/74; H04L 65/608; H04L 65/607; H04L 65/602; H04L 65/80; H04L 65/1069; H04L 65/1006; H04L 65/4015; H04L 65/1073; H04L 69/24; H04L 63/168; H04L 63/06; H04L 63/0876; H04L 51/04; H04L 51/38
USPC ........ 370/389; 709/228, 220, 203, 227, 230, 709/225, 250
See application file for complete search history.

(56) References Cited

U.S. PATENT DOCUMENTS

| | | | | |
|---|---|---|---|---|
| 8,984,110 | B1* | 3/2015 | Asveren | H04L 45/08 709/220 |
| 2004/0076145 | A1* | 4/2004 | Kauhanen | H04L 29/06027 370/352 |
| 2006/0274730 | A1* | 12/2006 | Medlock | H04L 29/06027 370/352 |
| 2008/0080568 | A1* | 4/2008 | Hughes | H04L 29/06027 370/519 |
| 2009/0006533 | A1* | 1/2009 | Guo | H04L 65/1046 709/203 |
| 2009/0010217 | A1* | 1/2009 | Belling | H04L 29/06027 370/329 |
| 2009/0121740 | A1* | 5/2009 | Hauke | H04H 60/07 326/30 |
| 2009/0172171 | A1* | 7/2009 | Amir | H04L 63/0428 709/227 |
| 2009/0274146 | A1* | 11/2009 | Zhu | H04L 29/12528 370/352 |
| 2010/0039963 | A1* | 2/2010 | Nagle | H04L 12/66 370/260 |
| 2010/0142413 | A1* | 6/2010 | Eriksson | H04L 12/1818 370/261 |
| 2012/0076131 | A1* | 3/2012 | Bianconi | H04L 65/605 370/352 |
| 2012/0079031 | A1* | 3/2012 | Matthews | H04L 12/18 709/206 |
| 2014/0036048 | A1* | 2/2014 | Furbeck | H04L 65/40 348/61 |

OTHER PUBLICATIONS

J. Rosenberg: Interactive Connectivity Establishment (ICE): A Protocol for Network Address Translator (NAT) Traversal for Offer/Answer Protocols; Apr. 2010, Internet Engineering Task Force (IETF).

* cited by examiner

Fig. 1

METHOD AND SYSTEM FOR NEGOTIATION OF MEDIA BETWEEN COMMUNICATION DEVICES FOR MULTIPLEXING MULTIPLE MEDIA TYPES

CROSS-REFERENCE TO RELATED APPLICATIONS

This application is a continuation application of U.S. patent application Ser. No. 14/226,119, which was filed on Mar. 26, 2014 and claims priority to European Patent Application No. 13001599.3, which was filed on Mar. 27, 2013.

FIELD OF INVENTION

The invention relates a method of negotiation of media between a source communication device and a destination communication device for multiplexing multiple media types on an IP transport address. The invention further relates to a computer program product for executing such a method and to a source communication device for negotiating of the media between the source communication device and a destination communication device.

BACKGROUND OF THE INVENTION

The Internet Protocol (IP) is a widely used protocol which nowadays is extensively used for telecommunication, for example for Voice over IP (VoIP). Along with voice data, it is possible to convey via IP other data such as a picture, e.g. in form of a bitmap, and/or text, e.g. in the form of an ASCII file (American Standard Code for Computer Information Interchange). It is thus possible to establish a multimedia session using voice along with text and/or pictures/video data, e.g. in the form of a video conference.

In order to reduce the number of flows of messages/data between participants for example in a conference to increase reliability and efficiency of the conference session, there is need to multiplex multiple media (audio, video and/or other data such as text, tables etc.) on to a single 5 Tuple (IP Address and Ports) with the result of reducing the number of IP transports, i.e. IP addresses and/or IP ports, used during a multimedia session. Therefore, another positive effect of the multiplexing of multiple media is that the total number of used IP transport addresses and/or ports is reduced per session leading to a larger number of multimedia sessions being able to be run simultaneously if the total number of IP transport addresses and/or ports is limited.

In telecommunications and computer networks, multiplexing, also known as muxing, is a method by which digital data streams are combined into one signal over a shared medium. The aim is to share an expensive resource. For example, in telecommunications, several telephone calls may be carried using one wire. Examples for Multiplexing methods include Time division Multiplexing (TDM) and Frequency division Multiplexing (FDM). The multiplexed signal is transmitted over a communication channel, which may be a physical transmission medium. The multiplexing divides the capacity of the high-level communication channel into several low-level logical channels, one for each message signal or data stream to be transferred. A reverse process, known as demultiplexing, can extract the original channels on the receiver side.

A 5-Tuple is made up of source IP address, destination IP address, source port number, destination port number and the protocol in use and is one of the elements that need to be negotiated between two peers before communication can take place. The negotiation between a sending/source entity and a receiving/destination entity of the signalling and payload parameters based on the Internet Protocol needs to be performed in a manner that is both interoperable with existing legacy devices which don't support this multiplexing and new implementations that do. The aim here is to also try to limit the number of SDP (Session Description Protocol) offer/answers exchanges needed to establish media, i.e. a payload path whereon media are transmitted between the source entity and the destination entity. SDP is a format for describing streaming media initialization parameters. The IETF (Internet Engineering Task Force) published the original specification as an IETF Proposed Standard in April 1998, and subsequently published a revised specification as an IETF Proposed Standard as RFC 4566 in July 2006. SDP is intended for describing multimedia communication sessions for the purposes of session announcement, session invitation, and parameter negotiation. SDP does not deliver media itself but is used for negotiation between end points/terminals/communication devices of media type, format, and all associated properties. The set of properties and parameters are often called a session profile.

Possible ways to reduce the number of flows of data/messages/streams between conference participants for efficiency and reliability reasons have been discussed in the IETF, the current approaches being proposed are discussed in the following drafts submitted to the IETF: draft-ietf-mmusic-sdp-bundle-negotiation-03 and draft-ejzak-mmusic-bundle-alternatives-01 which are incorporated herein as an integral part of this application by reference. Both of these approaches describe a mechanism for multiplexing different media using a new SDP grouping mechanism called "BUNDLE". In SDP, each media is described by what is called an m-line which includes the source port to be used for that media. The approaches describe how a mechanism for grouping these m-lines would work and how the ports are negotiated using the existing m-line. The disadvantage of both of these approaches is that they cannot fully specify the 5-tuple to be used for multiplexing until they have determined that the peer supports the bundling mechanism so these approaches are not sufficiently efficient.

SUMMARY OF THE INVENTION

The object of the invention is therefore to enable a source entity to negotiate with a destination entity to fully specify a 5-tuple to be used for multiplexing in a multimedia session without determination that the destination entity supports a multiplexing/grouping mechanism. In particular, the source entity should be enabled to negotiate with a destination entity to fully specify a 5-tuple to be used for multiplexing in an IP multimedia session without determination that the destination entity supports the SDP grouping mechanism called "BUNDLE". This object is solved by the method of negotiation of media between a source communication device and a destination communication device for multiplexing multiple media types on an IP transport address, wherein the method comprises the source communication device generating an offer message comprising an extension to the ICE protocol according to RFC 5245 to specify the IP transport address whereon the multiple media types can be multiplexed, wherein the offer message comprising the extension indicates support for both the multiplexing and a non-multiplexing of the multiple media types, and sending the offer message from the source communication device to the destination communication device.

The source and/or destination communication device, respectively, may be an IP phone of a local area network, a wide area network, such as the Internet, or any other area network. This communication device may be any mobile or stationary entity capable of sending and/or receiving data over a communication connection. Alternatively to the IP-phone, the communication device may be a mobile phone, a Personal Digital Assistant, a tablet PC, a laptop or the like. The communication device may also be a stationary unit such as a desktop PC or a server.

ICE is a technique used in computer networking involving network address translators (NATs) in Internet applications of Voice over Internet Protocol (VoIP), peer-to-peer communications, video, instant messaging and other interactive media. In such applications, NAT traversal is an important component to facilitate communications involving hosts on private network installations, often located behind firewalls. ICE is developed by the Internet Engineering Task Force MMUSIC working group and is published as RFC 5245.

The method may use the extension to the ICE (Interactive Connectivity Establishment) according to the standard [RFC 5245, RFC: Recall For comments] in a form of a candidate to specify an IP transport address for the candidate which can be used if the destination communication device receiving the candidate supports the extension and is able to multiplex multiple media streams, e.g. audio, video, and/or other data, on to a single transport address.

When used within an SDP Offer/Answer, wherein the SDP may be in accordance with RFC 4566 and wherein the Offer/Answer may be according to RFC 3264, the source communication device generating the SDP Offer/Answer is enabled to generate SDP messages which, when received by a destination communication device that is not aware of this extension, appears as a conventional valid, i.e. normal, SDP Offer/Answer on which the destination communication device can respond to accordingly.

However when an SDP Offer is received by a destination communication device, also called implementation, that is able to read, i.e. does understand, this extension the destination communication device is able to respond with an SDP Answer which specifies the multiplexed ports to be used and is able to send media, i.e. payload, to the multiplex port specified in the offer.

This means that within a single (RFC 3264-)offer/answer cycle it is possible to negotiate the (IP-)transport address to be used for media with legacy communication devices/implementations which are not aware of this extension and with implementations that are aware of the extension.

Communication devices/implementations which are aware of this extension are now able to use the port specified in the extension rather than in the ICE candidate port according to RFC 5245 and then follow existing ICE procedures as specified in RFC 5245.

A possible name for the extension is "bundleport" but other names are possible. Another ICE extension could be used to indicate which ICE candidate(s) in an (SDP-) Offer may be multiplexed on to a single transport.

An example offer message of the invention embodied in an SDP Offer in 21 consecutive lines is shown in the following:

v=0
o=alice 2890844526 2890844526 IN IP4 host.sen.com
s=
c=IN IP4 192.0.2.2
t=0 0
a=group:BUNDLE foo bar
m=audio 10000 RTP/AVP 0 8 97
a=mid:foo
b=AS:200
a=rtpmap:0 PCMU/8000
a=rtpmap:8 PCMA/8000
a=rtpmap:97 iLBC/8000
a=candidate:1 1 UDP 1694498815 2001:::1 10000 typ host bundleport 10000
a=candidate:2 1 UDP 1694498814 192.0.2.2 20000 typ host bundleport 20000
m=video 10002 RTP/AVP 31 32
a=mid:bar
b=AS:1000
a=rtpmap:31 H261/90000
a=rtpmap:32 MPV/90000
a=candidate:1 1 UDP 1694498815 2001:::1 10002 typ host bundleport 10000
a=candidate:2 1 UDP 1694498814 192.0.2.2 20002 typ host bundleport 20000

In the inventive example, the offer contains the parts of the 5-tuple specified by the offeror, i.e. source IP Address, Source Port and the Protocol. The other parts, i.e. Destination IP Address and Port would come from the destination communication device/peer entity in the SDP answer (not shown).

The prior art approaches discussed above describe how a mechanism for grouping the m-lines would work and how the ports are negotiated using the existing m-line which are. The existing port is 10000 in line 7 and 10002 in line 15. The inventive method builds on this grouping mechanism using an extension to the ICE protocol.

The ICE candidate explicitly specifies the port to be used for multiplexing media in line 13 for audio data: a=candidate:1 1 UDP 1694498815 2001:::1 10000 typ host bundleport 10000. In the inventive embodiment the source communication device is dual stack IPv4/6 and therefore comprises both candidates in the offer in line 14 for the audio data: a=candidate:2 1 UDP 1694498814 192.0.2.2 20000 typ host bundleport 20000. In the example the two candidates in line 13 and 14 relate to the two transport addresses for Ipv4 and IPV6 independent of a used codec. The same 5-tuple is used whatever the codec may be.

For the video data, there are two ICE candidates comprised in the offer message as well. The bundleport in line 20 indicates that the video can be multiplexed with the audio on port 10000: a=candidate:1 1 UDP 1694498815 2001:::1 10002 typ host bundleport 10000. If IPv6 instead of IPv4 is used the bundle port will be port 20000: a=candidate:2 1 UDP 1694498814 192.0.2.2 20002 typ host bundleport 20000.

Lines 13, 14, 20 and 21 thus represent the inventive ICE extensions in the embodiment shown above.

The disadvantage of the prior art approaches which are avoided by executing the inventive method is that these approaches cannot fully specify the 5-tuple to be used for multiplexing until they have determined that the destination communication device supports the bundling mechanism and are thus not sufficiently efficient. The inventive method solves this problem in a downward compatible manner for a destination communication device/remote party supporting ICE.

In another embodiment the sending of the SDP offer message from the source communication device to the destination communication device is executed before the source communication device receives information about a capability of the destination communication device to multiplex multiple media types on an IP transport address.

If the offer message is received by the destination communication device that understands the extension, the destination communication device may be enabled to respond to the source communication device with an answer message which specifies at least one multiplexed port to be used for the multiplexing, and, if the offer message is received by the destination communication device that is unaware of the extension, the offer message may be a valid offer message to the destination communication device such that the destination communication device is enabled to respond to the offer message with sending a valid response message to the source communication device.

The extension to the ICE protocol is advantageously used for initiating the "BUNDLE" SDP grouping mechanism for multiplexing different media types.

Support for both the multiplexing and a non-multiplexing of the multiple media types is indicated with advantage to the destination communication device in a single message.

The extension may comprise in another embodiment at least one candidate specifying an IP port to be used by the destination communication device for the multiplexing.

Further, the multiple media types may be multiplexed on a single IP transport address and an IP port.

The offer message is formed in an embodiment of the invention as a SDP offer message.

Here, the media for multiplexing multiple media types on an IP transport address may be negotiated between the source communication device and the destination communication device in a single SDP offer/answer cycle.

With advantage, the destination communication device may respond validly with sending a single message to the source communication device independently of whether the destination communication device supports the multiplexing of multiple media types on an IP transport address or not.

The source communication device and the destination communication device may be configured as peer-to-peer devices. The peer-to-peer devices may be set up in an ad-hoc network for spontaneous negotiation of media types.

A computer program product for executing the inventive method as outlined above may be provided. The computer program product may be a software product comprising instructions. The computer program product may be comprised by a machine readable medium wherein the machine readable medium may be a floppy disk, a CD (Compact Disc), a DVD (Digital Versatile Disc), or any other suitable digital or analogue medium.

The invention further comprises a source communication device for negotiating of media between the source communication device and a destination communication device for multiplexing multiple media types on an IP transport address, wherein the source communication device comprises an offer message generating unit configured to generate an offer message comprising an extension to the ICE protocol according to RFC 5245 to specify the IP transport address whereon the multiple media types can be multiplexed, wherein the offer message comprising the extension indicates support for both the multiplexing and a non-multiplexing of the multiple media types, and a sending unit configured to send the offer message from the source communication device to the destination communication device.

The object of the invention is solved by this source communication device for the same reasons as outlined above with respect to the inventive method. The source communication device may be a mobile phone, a wired phone, such as an office phone, a PDA (Personal Digital Assistant), a PC (Personal Computer), a tablet PC or any other communication device comprising the apparatus features as outlined above. Respective forms as for the source communication device are possible for the destination communication device.

The source communication device which may be a multimedia device supports ICE [RFC 5245], initiates communication with the destination communication device which may be a peer device and supports the ability to multiplex multiple media types on a single IP address and port. The source communication device may not know the capabilities of the destination communication device and is able to indicate support for both the multiplexing of media types and the non multiplex in a single message to the destination communication device. The destination communication device may respond with a single message independently of whether it supports the multiplex or not.

In a further embodiment, a communication system comprises the inventive source communication device and a destination communication device configured to negotiate media with the source communication device.

Further embodiments and advantages of the invention are highlighted in the following with respect to figures. For an improved clearness, the figures are not true to scale or proportionate. In the figures, as long as not mentioned otherwise, same references indicate same parts with same meaning.

DESCRIPTION OF THE PREFERRED EMBODIMENTS

Figure 1:
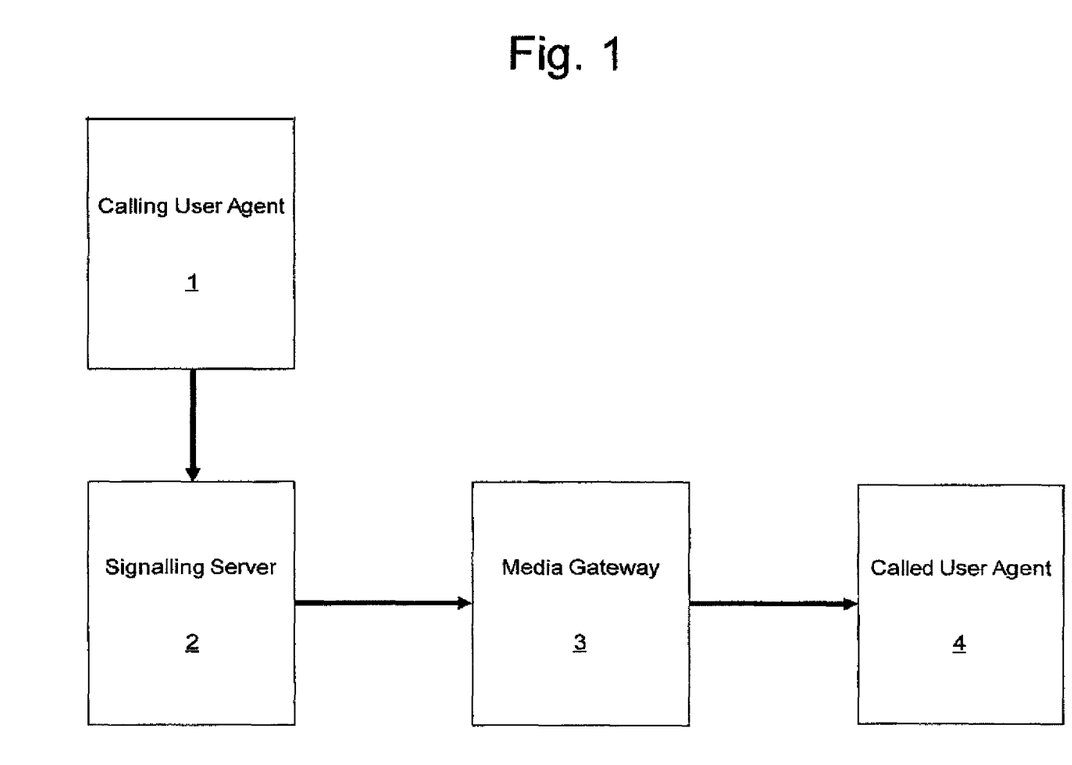
FIG. 1 is a schematic arrangement according to the invention, wherein a source communication device 1 is sending an offer message to a destination communication device 4 via a server 2 and gateway 3.

In FIG. 1, the source communication device represented by a calling User Agent 1, initiates the communication towards the destination communication device represented by the called user agent 4. The source communication device does not know whether the called user agent 4 supports multiplexing of media streams and provides its media capabilities and transport address to the calling user agent 1.

A signalling server 2 passes the communication establishment requests of the calling user agent 1 towards the intended recipient, the called user agent 4, via the gateway 3. The media gateway 3 may be optionally deployed on the path between the source communication device and the destination communication device which will relay both the signalling and payload messages between the devices, in short signalling and media.

The called user agent 4 using the destination communication device receives the offer message from the source communication device of the calling user agent 1 to communicate with and respond to the calling user agent 1 with its own media capabilities and transport address.

Figure 2A:
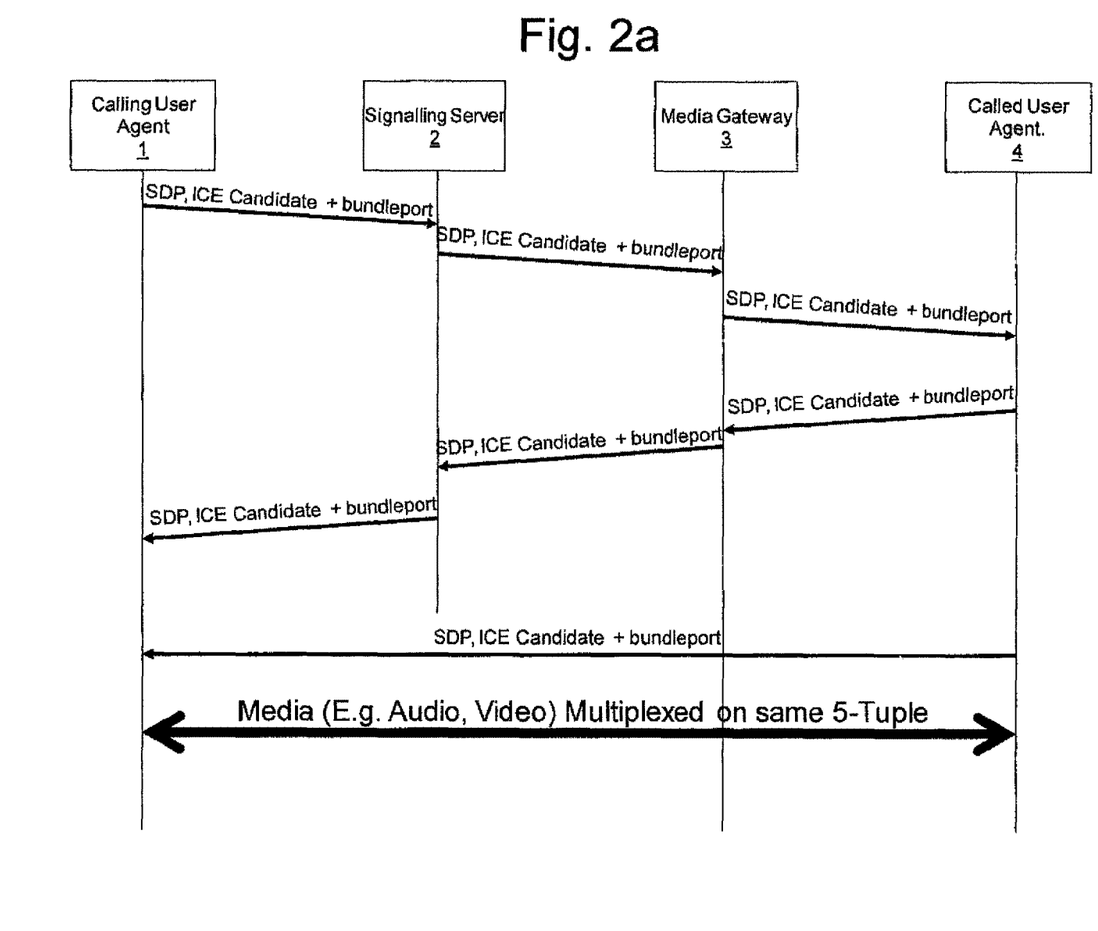
FIG. 2a is a schematic flow chart according to the invention between the entities shown in FIG. 1, wherein the destination communication device supports the ICE extension.

In FIG. 2a, the messages exchanged between the calling user agent 1, the server 2, the gateway 3, and the called user agent 4 are shown in the case where the destination communication device of the called user agent 4 supports the ICE extension as comprised by the inventive SDP Offer (21 lines) discussed above. As the destination communication device of the called user agent 4 supports the ICE extension of lines 13, 14, 20, 21, it sets up a signaling path "SDP, ICE Candidate+bundleport. Following the establishment of the signaling path, a payload path "Media" multiplexed an the same 5-Tuple for the audio data as for the video data mentioned in the inventive SDP offer message is used be the source communication device of the calling user agent 1 and the destination communication device of the called user agent 4.

Figure 2B:
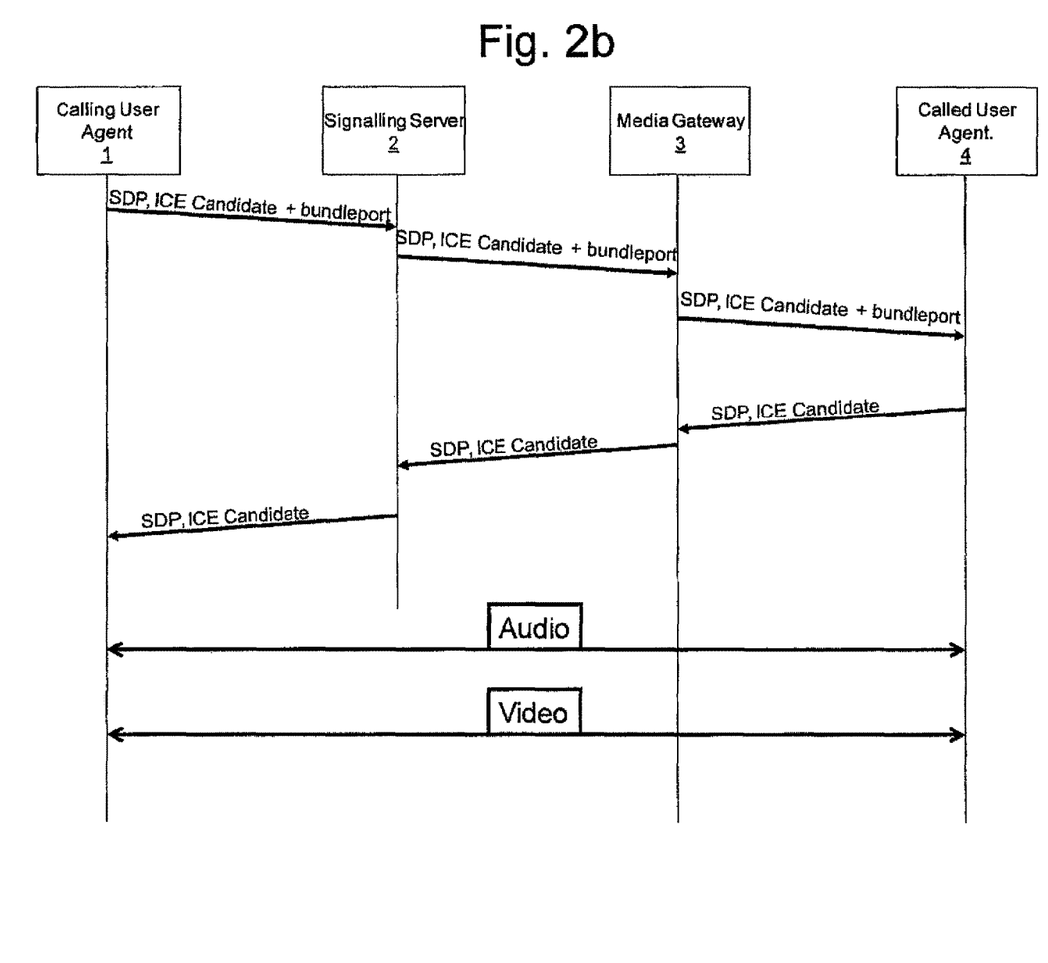
FIG. 2b is another schematic flow chart according to the invention between the entities shown in FIG. 1, wherein the destination communication device does not support the ICE extension.

In FIG. 2b, the messages exchanged between the calling user agent 1, the server 2, the gateway 3, and the called user agent 4 are shown in the case where the destination communication device of the called user agent 4 does not support the ICE extension as comprised by the inventive SDP Offer (21 lines) discussed above. As the destination communication device of the called user agent 4 does not support the ICE extension of lines 13, 14, 20, 21, it sets up separate payload paths using different ports for the audio data and the video data. Since in both cases, the destination communication device of the called user agent 4 supporting (FIG. 2a) and not supporting (FIG. 2b) the ICE extension, a multimedia connection comprising audio and video data is set up by executing the inventive method of sending an offer message comprising an extension to the ICE protocol according to RFC 4245 to specify the IP transport address whereon the multiple media types can be multiplexed, wherein the offer message comprising the extension indicates support for both the multiplexing and a non-multiplexing of the multiple media types, to the destination communication device, the method is downward compatible with destination communication device both supporting and not supporting the ICE extension.

By executing the inventive method/source communication device media types are enabled to be negotiated in one (SDP-)offer/answer cycle for both the case when the destination communication device is capable of handling the multiplexing/bundling of the media types and the case when destination communication device is a legacy device not aware of this capability.

The advantages are:

1. The initial (SDP-)Offer is able to describe both the multiplexed and non-multiplexed cases in a way that is compatible with legacy destination communication device/implementations.

2. Only one offer/answer cycle is needed to negotiate both the multiplexed and non-multiplexed cases.

3. The inventive method/source communication device works for the IPv4/IPv6 dual stack scenario in which the port eventually used may only initially be signalled in the candidate line.

The invention may be executed with another form of offer message than the SDP offer described herein before as an embodiment. In FIGS. 1, 2a, 2b, the server 3 and/or the gateway 3 may be missing. Instead of audio and video data, other forms of data such as text may be combined with audio and/or video data to form multimedia date to be multiplexed.

A technical feature or several technical features which has/have been disclosed with respect to a single or several embodiments discussed herein before may be present also in another embodiment except it is/they are specified not to be present or it is impossible for it/them to be present for technical reasons.

What is claimed:

1. A method for negotiation of media between a first communication device and a second communication device, the method comprising:
    the first communication device generating an offer message having an extension that is in accordance with Interactive Connectivity Establishment (ICE) protocol, the extension identifying transport addresses for first and second transport candidates for communication of audio data to identify the first and second transport candidates for communication of audio data and identifying transport addresses for first and second transport candidates for communication of video data to identify the first and second transport candidates for communication of video data, the first and second transport candidates for communication of audio data and the first and second transport candidates for communication of video data supporting both multiplexing transmission and non-multiplexing transmission, the extension also comprising a first bundleport identifier indicating a transport address for multiplexing of audio data and a second bundleport identifier indicating a single transport address for multiplexing of both audio data and video data;
    the first communication device sending the offer message to the second communication device to establish a communication connection along at least one payload path for the transmission of audio and video data between the first and second communication devices, the offer message being sent prior to the first communication device receiving information of a capability of the second communication device to multiplex multiple media types on a transport address; and
    establishing only a single payload path between the first and second communication devices for transmission of both audio data and video data via multiplexing utilizing the single transport address indicated by the second bundleport identifier in response to the first communication device receiving an answer to the offer message indicating that multiplexing of audio data and video data is supported at the second communication device, the single payload path being a 5 Tuple connection.

2. The method of claim 1, wherein the first bundleport identifier identifies a port for multiplexing of audio data and the second bundleport identifier identifies a port for multiplexing of video data and audio data.

3. The method of claim 2, wherein the transport addresses are internet protocol (IP) transport addresses.

4. The method of claim 3, wherein the offer message is generated in accordance with Session Description Protocol (SDP).

5. The method of claim 1, comprising:
    a signaling server receiving the offer message and forwarding the offer message to a media gateway;
    the media gateway receiving the offer message and forwarding the offer message to the second communication device;
    the second communication device sending the answer in response to receiving the offer message;
    the media gateway receiving the answer and forwarding the answer to the signaling server; and
    the signaling server receiving the answer and forwarding the answer to the first communication device.

6. The method of claim 5, comprising:
    the first communication device receiving the answer to the offer message.

7. The method of claim 6, wherein the single payload path is a 5 Tuple connection.

8. The method of claim 6, wherein the single payload path has a single Internet Protocol (IP) transport address and a single IP port at the first communication device.

9. The method of claim 6, wherein the answer is in accordance with Session Description Protocol (SDP).

10. The method of claim 7, wherein the first bundleport identifier of the offer message identifies a port for multiplexing of audio data and the second bundleport identifier of the offer message identifies a port for multiplexing of video data and audio data; and
wherein the first communication device is a telephone, a mobile phone, a personal digital assistant, a tablet, a laptop, or a computer and the second communication device is a telephone, a mobile phone, a personal digital assistant, a tablet, a laptop, or a computer.

11. The method of claim 2, also comprising:
the first communication device receiving the answer to the offer message.

12. The method of claim 1, comprising:
the second communication device responding to the offer message by sending the answer;
establishing a first payload path between the first and second communication devices for transmission of audio data and a second payload path between the first and second communication devices for transmission of video data in response to the answer indicating the second communication device does not support multiplexing.

13. The method of claim 12, wherein the first communication device is a telephone, a mobile phone, a personal digital assistant, a tablet, a laptop, or a computer and the second communication device is a telephone, a mobile phone, a personal digital assistant, a tablet, a laptop, or a computer.

14. The method of claim 12, wherein the at least one payload path is established such that only a single offer/answer cycle between the first and second communication devices takes place for establishment of the single payload path or establishment of the first and second payload paths.

15. The method of claim 12, wherein the answer is sent by the second communication device independently of whether the second communication device supports multiplexing of multiple media types.

16. A non-transitory machine readable medium containing a program that is executable by a first communication device, the first communication device performing a method defined by the program when the program is executed by the first communication device, the method comprising:
the first communication device generating an offer message having an extension that is in accordance with Interactive Connectivity Establishment (ICE) protocol, the extension identifying transport addresses for first and second transport candidates for communication of audio data to identify the first and second transport candidates for communication of audio data and identifying transport addresses for first and second transport candidates for communication of video data to identify the first and second transport candidates for communication of video data, the first and second transport candidates for communication of audio data and the first and second transport candidates for communication of video data supporting both multiplexing transmission and non-multiplexing transmission, the extension also comprising a first bundleport identifier indicating a transport address for multiplexing of audio data and a second bundleport identifier indicating a single transport address for multiplexing of both audio data and video data;
the first communication device sending the offer message to the second communication device to establish a communication connection along at least one payload path for the transmission of audio and video data between the first and second communication devices, the offer message being sent prior to the first communication device receiving information of a capability of the second communication device to multiplex multiple media types on a transport address, the communication connection to be established as only a single payload path between the first and second communication devices for transmission of both audio data and video data via multiplexing utilizing the single transport address indicated by the second bundleport identifier in response to an answer to the offer message indicating that multiplexing of audio data and video data is supported at the second communication device.

17. The non-transitory machine readable medium of claim 16, wherein the first bundleport identifier identifies a port for multiplexing of audio data and the second bundleport identifier identifies a port for multiplexing of video data and audio data.

18. The non-transitory machine readable medium of claim 16,
wherein the method also comprises establishing only the single payload path between the first and second communication devices for transmission of both audio data and video data via multiplexing in response to the answer that responded to the offer message from the second communication device.

19. The non-transitory machine readable medium of claim 18, wherein the single payload path is a 5 Tuple connection.

20. A communication system comprising:
a first communication device;
a second communication device that is connectable to the first communication device;
the first communication device configured to generate an offer message identifying a first transport candidate for communication of audio data and a second transport candidate for communication of audio data and a first transport candidate for communication of video data and a second transport candidate for communication of video data, the first and second transport candidates for communication of audio data and the first and second transport candidates for communication of video data supporting both multiplexing transmission and non-multiplexing transmission;
wherein the offer message also comprises a first bundleport identifier indicating a transport address for multiplexing of audio data and a second bundleport identifier indicating a single transport address for multiplexing of both audio data and video data;
the first communication device configured to send the offer message to the second communication device to establish a communication connection along at least one payload path for the transmission of audio and video data between the first and second communication devices;
the second communication device configured to respond to the offer message by sending an answer message such that:
only a single payload path is established between the first and second communication devices for transmission of both audio data and video data via multiplexing utilizing the single transport address identified by the second bundleport identifier in response to the answer message indicating that the second communication device supports multiplexing of audio data and video data, and a first payload path between the first and second communication devices for transmission of audio data and a second payload path between the first and second communication devices for transmission of video data is established in response to the answer message indicating the second communication device does not support multiplexing;

wherein the single payload path between the first and second communication devices for transmission of both audio data and video data via multiplexing is a single 5 Tuple connection; and wherein the first communication device is configured to send the offer message prior to the first communication device receiving information of a capability of the second communication device to multiplex multiple media types on a transport address.

\* \* \* \* \*